(12) United States Patent
Fischer et al.

(10) Patent No.: US 12,130,041 B2
(45) Date of Patent: Oct. 29, 2024

(54) DUCT TIE ROD AND METHOD

(71) Applicants: Joshua Fischer, Imperial, MO (US);
Herbert J. Fischer, Imperial, MO (US)

(72) Inventors: Joshua Fischer, Imperial, MO (US);
Herbert J. Fischer, Imperial, MO (US)

(73) Assignee: H J Fischer LLC, Imperial, MO (US)

( * ) Notice: Subject to any disclaimer, the term of this patent is extended or adjusted under 35 U.S.C. 154(b) by 405 days.

(21) Appl. No.: 17/727,676

(22) Filed: Apr. 22, 2022

(65) Prior Publication Data

US 2022/0341621 A1 Oct. 27, 2022

Related U.S. Application Data

(60) Provisional application No. 63/178,189, filed on Apr. 22, 2021.

(51) Int. Cl.
*F24F 13/02* (2006.01)
*F16B 37/04* (2006.01)

(52) U.S. Cl.
CPC ........ *F24F 13/0209* (2013.01); *F16B 37/042* (2013.01)

(58) Field of Classification Search
CPC ... F24F 13/0209; F16B 37/042; F16B 5/0225; F16B 25/0021; F16B 25/106; F16B 43/001; F16B 5/02
USPC ....................................................... 248/300
See application file for complete search history.

(56) References Cited

U.S. PATENT DOCUMENTS

| | | | | |
|---|---|---|---|---|
| 2,155,810 | A * | 4/1939 | Tinnerman | A47J 45/078 411/116 |
| 3,128,871 | A * | 4/1964 | Huber | B65G 21/00 198/816 |
| 4,045,933 | A * | 9/1977 | Grillo | E04C 2/384 52/475.1 |
| 4,058,859 | A * | 11/1977 | Arrowood | E03D 11/143 4/252.3 |
| 4,161,974 | A * | 7/1979 | Patterson | B23D 45/021 144/287 |
| 4,603,828 | A * | 8/1986 | Farley, Jr. | A63H 33/006 248/103 |
| 5,020,172 | A * | 6/1991 | Timm | A47C 19/128 5/200.1 |
| 6,752,097 | B1 * | 6/2004 | Elson | B29C 41/04 114/77 R |
| 6,941,712 | B2 * | 9/2005 | Sukup | E04H 7/30 248/300 |

(Continued)

*Primary Examiner* — Muhammad Ljaz
(74) *Attorney, Agent, or Firm* — Matthews Edwards LLC

(57) ABSTRACT

A tie rod for spanning a duct interior to join duct walls bounding the duct interior, that can be simply and inexpensively fabricated from sheet metal or other suitable material, including automatically, securely fastenable quickly and easily to the duct walls, often by one person, and which can be configured to be nestable for efficient storage and shipping, of elongate construction for spanning a duct interior, with a transverse attachment flange or flanges that can be pre-bent or bent onsite at the installation location via special bending features to snug to a duct wall, and include holes for threadedly receiving fasteners, having a shape and size to reduce fastening torque, with a two attachment flange configuration that resiliently self retains the fastener against loosening from vibration and other forces.

18 Claims, 13 Drawing Sheets

(56) References Cited

U.S. PATENT DOCUMENTS

| | | | | |
|---|---|---|---|---|
| 7,735,794 B1* | 6/2010 | Gretz | ............... | E04B 9/006 |
| | | | | 248/200.1 |
| 7,823,846 B2* | 11/2010 | Williams, III | ............ | F16L 5/00 |
| | | | | 52/696 |
| 8,403,289 B1* | 3/2013 | Rinderer | ............... | H02G 3/126 |
| | | | | 220/3.9 |
| 8,763,965 B1* | 7/2014 | Peay | ............... | A47L 15/427 |
| | | | | 248/300 |
| 8,800,943 B2* | 8/2014 | Long | ............... | F24F 7/007 |
| | | | | 248/200.1 |
| 8,979,043 B2* | 3/2015 | Florman | ............... | B23P 19/00 |
| | | | | 248/248 |
| 2003/0200608 A1* | 10/2003 | Polevoy | ............... | A47C 19/025 |
| | | | | 5/200.1 |
| 2008/0217494 A1* | 9/2008 | Simpson | ............ | E05B 65/0071 |
| | | | | 248/205.1 |
| 2009/0057221 A1* | 3/2009 | Bridges | ............... | B01D 29/111 |
| | | | | 210/493.2 |
| 2011/0078962 A1* | 4/2011 | Gravel | ............... | E04H 4/144 |
| | | | | 52/182 |
| 2011/0255937 A1* | 10/2011 | Singer | ............... | A01G 9/20 |
| | | | | 156/227 |
| 2015/0259907 A1* | 9/2015 | Points | ............... | E04B 7/024 |
| | | | | 52/750 |
| 2016/0102891 A1* | 4/2016 | Paponneau | ............ | F24S 25/65 |
| | | | | 248/251 |
| 2018/0305925 A1* | 10/2018 | Cecchetto, Jr. | ............ | E04B 2/90 |
| 2022/0341621 A1* | 10/2022 | Fischer | ............... | F16B 5/0225 |
| 2022/0389709 A1* | 12/2022 | LeBlang | ............... | E04B 2/58 |

* cited by examiner

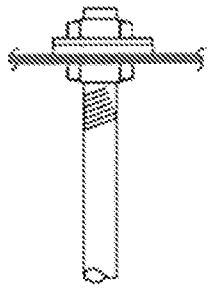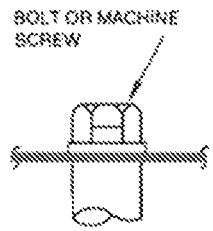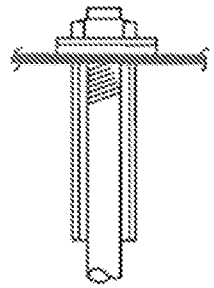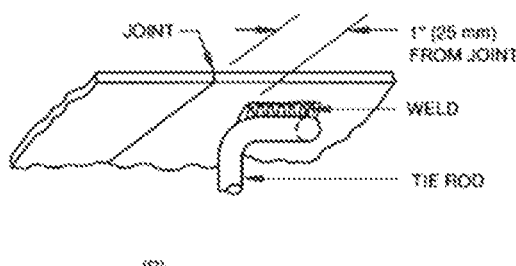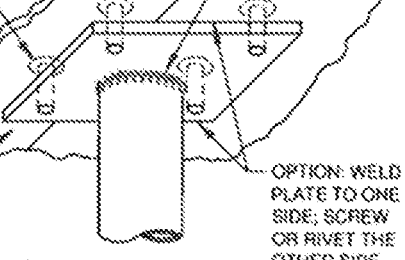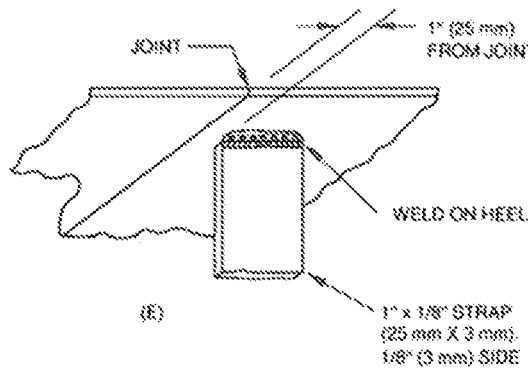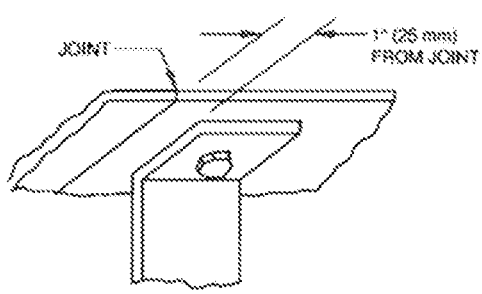
FIG. 1

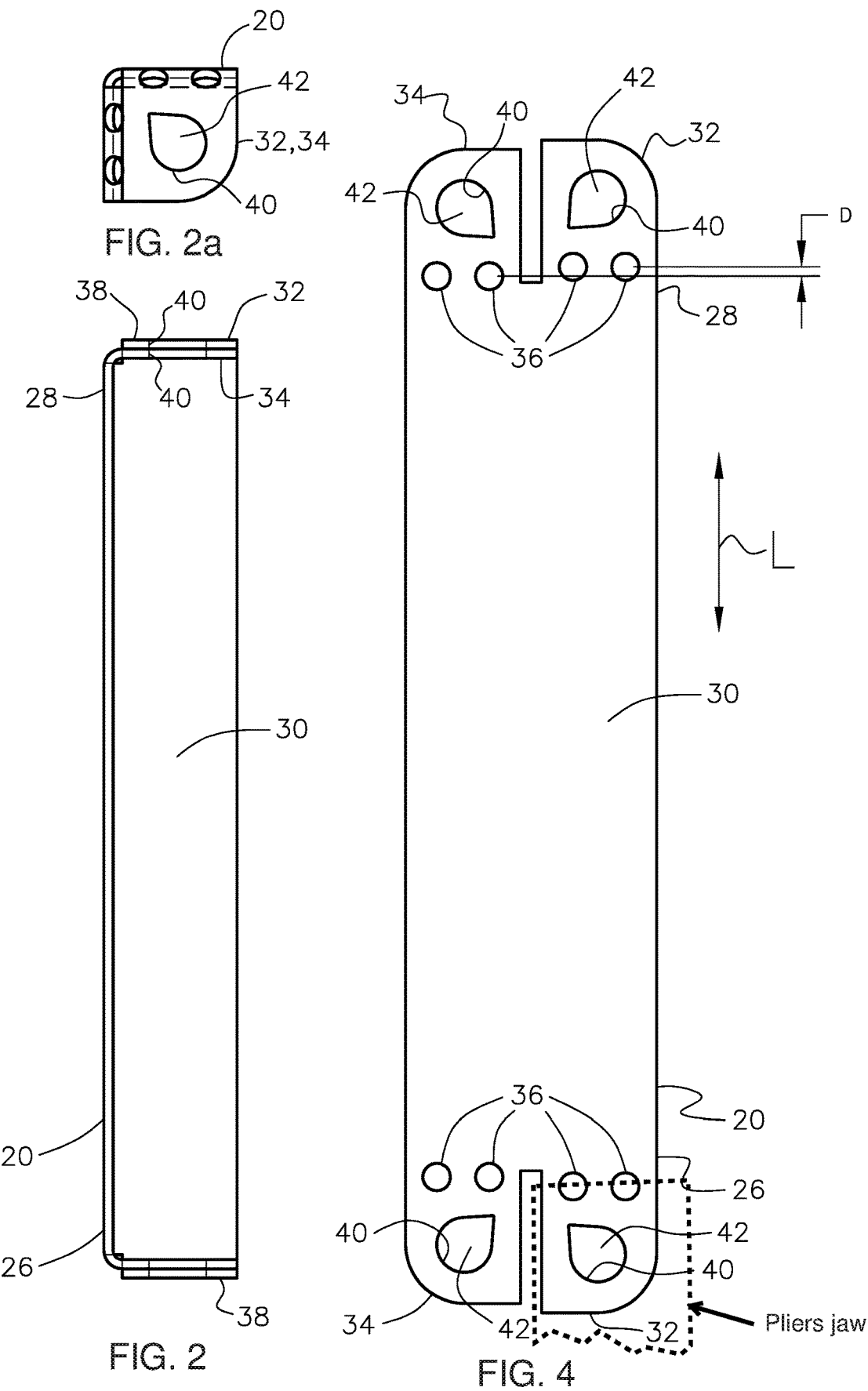

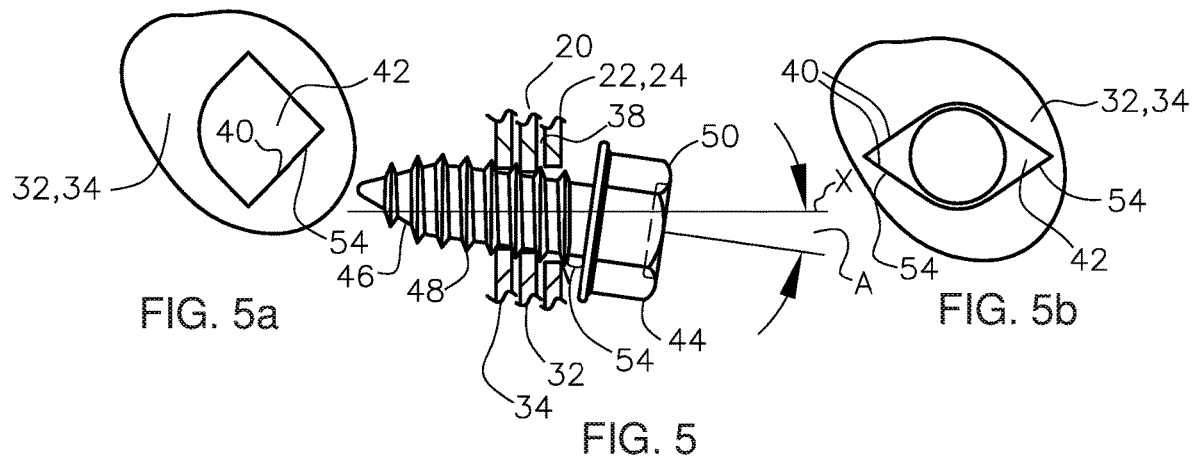
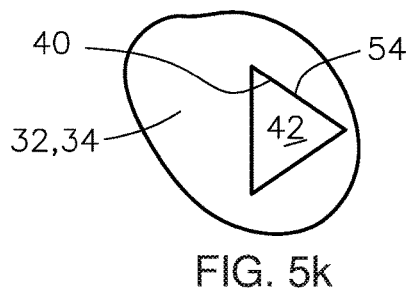

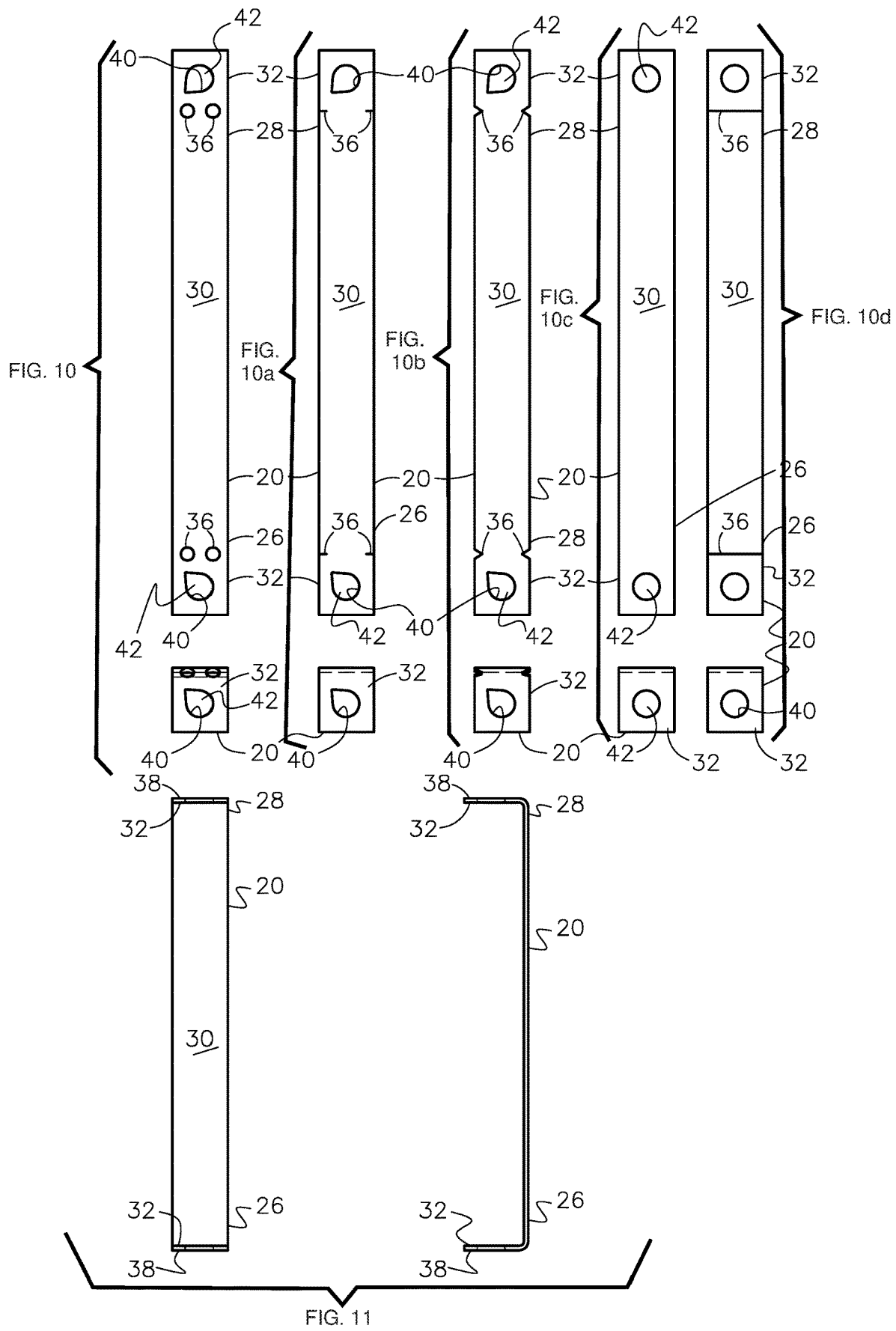

DUCT TIE ROD AND METHOD

This application claims the benefit of U.S. Provisional Application No. 63/178,189, filed Apr. 22, 2021.

TECHNICAL FIELD

This invention relates generally to a tie rod for spanning a duct interior to join duct walls bounding the duct interior, and, more particularly, that can simply and inexpensively fabricated from sheet metal or other suitable material, including automatically, is securely fastenable quickly and easily to the duct walls, often by one person, and which can be configured to be nestable for efficient storage and shipping.

BACKGROUND ART

U.S. Provisional Application No. 63/178,189, filed Apr. 22, 2021, is incorporated herein by reference in its entirety.

The use of tie rods to reinforce and prevent or reduce deflection of duct walls in the HVAC (Heating, Ventilating, and Air Conditioning) industry are required as well as desired at certain locations within a duct system. Essentially, during operation, when air is flowing through the duct interior, positive pressure conditions can be sufficient to outwardly deflect the duct walls, typically constructed of thin gauge sheet metal. Negative pressure conditions can be sufficient to inwardly deflect the duct walls. In either instance, the deflection can be noisy, impact air flow, and result in metal fatigue in associated structural elements. The industry requirements for tie rods are intended to reduce these problems. Presently permitted tie rod configurations include solid rods, threaded rods, tubes, pipes, and straps. Each alternative is attached to an associated duct wall by welding or threaded fastening. To facilitate installation, automated machines can be used for perforating duct walls for receiving fasteners such as screws, bolts, and the like, for attaching the tie rods. Alternatively, holes can be manually drilled or punched through the duct walls at the fabrication shop or job site.

The tie rods can be fabricated in advance or at the job site. The tie rods are most commonly secured with threaded fasteners. For rod style tie rods, a retaining or abutment collar is typically secured around the rod at a certain distance from each rod end, and includes a male threaded element that is inserted from the interior of the duct through a hole in the duct wall, and secured with a mating female threaded element or nut that abuts the exterior surface of the duct wall. Reference in this regard, U.S. Pat. No. 6,116,833. The abutment collars abut the interior duct wall surface to prevent inward deflection of the wall, and the nuts prevent outward deflection. Tubing style tie rods, typically constructed of electrical conduit, have inserts in the form of stop nuts or studs driven into their open ends. A bolt or screw is then inserted from the outside through the duct wall hole to engage the nut, or the stud is inserted through the hole and retained with an external nut. The end of the tube serves as the internal abutment to prevent deflection of the duct wall, and the nut or bolt head serves as the external abutment. Piping style tie rods use bolt plates welded to the ends which are fastened to the duct walls. Rod or strap style tie rods will be welded or fastened to the duct walls. See FIG. 1 that shows the various tie rod configurations commercially used.

Observed shortcomings of various of the known tie rod configurations include complexity and cost, namely, in that threaded rod, tubing, and piping are expensive and require specialized abutment devices that must be installed: e.g., for threaded rods, and within tubing style tie rods; welding in the case of welded attached rods and pipes; and that threaded fasteners that require both bolts and nuts require a person on the inside and a person on the outside to fasten, and that the nuts and bolts can loosen and even be lost as a result of vibration and other causes. Regarding the strap configuration (item F above), they are presently indicated as being permitted for positive pressure applications only as they can be subject to bowing lengthwise under negative pressures.

As an additional point, it is well known to join sheet metal members such as tie rods, reinforcing brackets and the like, with sheet metal screws, using no nuts. When doing so, the sheet metal is cut or deformed into threads that hold the screw. However, if more than two layers of sheet metal are to be joined, or one or both layers is of a heavy gauge, significant torque can be required. Often, the assembler will use a powered hand tool to drive the screw. This can result in spinout wherein the initially cut threads or deformation for holding the screw are destroyed resulting in a loose screw that can fall out due to vibration. In duct work, this can result in a loose tie rod that can rattle from vibration, ineffective bracing, and holes through which air can leak.

Thus, what is sought is a duct tie rod, and a manner or manners of fabricating and installing the same that overcomes one or more of the shortcomings and limitations set forth above.

SUMMARY OF THE INVENTION

What is disclosed is various embodiments of a duct tie rod and manners of fabricating and installing the same t tie rods in connection with duct walls of ducts, that overcomes one or more of the shortcomings and limitations set forth above. The tie rods of the invention can be simply and inexpensively fabricated from sheet metal or other suitable material, including automatically, and are securely fastenable quickly and easily to the duct walls, optionally by one person, without need of tightening nuts and bolts together from inside and outside of the duct. Optionally, the tie rods of the invention can be fabricated in one of several straight, nestable configurations that is tightly stackable or nestable, to save storage and shipping space. The ends of the stackable tie rods have at least one integral attachment flange at, or that can be bent into, an angular orientation for abutting and attaching to the duct walls.

According to a preferred aspect of the invention, the tie rods have an elongate body of one piece, sheet metal or plastics construction, comprising a V-, C-, L-, flat or tubular, cross sectional shape terminating at opposite longitudinal ends, at least one of the ends having at least one integral attachment flange transverse to the longitudinal direction L, that is, crosswise at an acute, perpendicular, or obtuse, angle to the lengthwise or longitudinal direction or extent of the body of the tie rod, as appropriate for attachment to a similarly angled duct wall, for attaching to the duct wall in abutment thereto. The at least one integral attachment flange can be formed, e.g., bent, to the transvers angle to the longitudinal direction at the time of fabrication, or can be bent to that angle at the job site or elsewhere, which provides advantages including making final length and/or angle adjustment if necessary, and allowing the tie rod to be stored and shipped in a straight, unbent configuration which facilitates nesting multiple tie rods together in a stack or array for space savings. To facilitate later bending, the tie rod can include bending features at the bending location that reduce the structural strength at that isolated location to make bending easier so as to be manually accomplished, alone or with simple hand tools such as a pliers, vise grips, or the like, which features can comprise as non-limiting examples, a hole or holes or a pre-scored line, groove, or cut in the tie rod along the bend location only so as to not otherwise weaken the tie rod against bending or deformation forces. In this latter regard, such features should not be sufficiently weakened that contemplated air pressures exerted against the duct wall will be sufficient to flex the tie rod, and particularly the flanges, to any significant extent under expected loading conditions during operation. Fabrication of the tie rod body can be by any suitable metal forming process, such as stamping and bending from sheet metal, or laser cutting or plasma cutting from sheet metal and bending, or the like.

As an optional configuration, the tie rods of the invention can be constructed with flange bent to the transverse angle prior to installation, and the flange still straight, to be bent by forceably inserting the tie rod into the duct to bend the flange to the transverse angle in abutment with the interior surface of the duct wall. This can be advantageous to bend the flange to the exact dimension of the duct, for a tighter, snugger fit. The forces required can be of a magnitude to require tapping or hammering the tie rod into the duct interior with a mallet or hammer for installation, to ensure that the duct wall is maintained in position against deflection by air pressure conditions. There can also be a degree of retained resilient elasticity in the flange, so as to be spring loaded against the duct wall to maintain abutting contact but not allow significant flexure of the wall under anticipated air pressure conditions.

As another preferred aspect, the integral attachment flange at the end of the tie rod if just one is used, or a longitudinally endmost one of the integral attachment flanges if there is more than one on an end of the tie rod, has a longitudinally outwardly facing bearing surface positioned and oriented to bear against a duct wall. The integral attachment flange additionally preferably has an unthreaded internal edge surface bounding and defining a hole or aperture through the flange configured to threadedly receive and engage a threaded fastener, and most preferably a large screw or bolt as disclosed in Fischer U.S. Pat. No. 10,544, 891 B2, the disclosure of which patent is hereby incorporated herein by reference in its entirety.

The hole in the flange or flanges as well as in duct wall, can have any of the shapes disclosed in U.S. Pat. No. 10,544,891 B2, namely, diamond shaped, teardrop, eye, oval, rectangular, round, or a composite of the shapes, as well as other shapes that provide the below described functionality. The nominal size of the hole is preferably marginally larger than the root diameter of the threaded shank of the threaded fastener but smaller than the major diameter of the thread, and combined with the shape, allows the fastener to threadedly engage the hole while passing therethrough without the fastener thread cutting a thread in or significantly cutting or deforming the internal edge surface bounding the hole, or the edge cutting the thread of the fastener, which is a desirable energy saving feature. This is desirable as will be explained, as it allows rotating passage of the thread of the fastener through the hole with minimal torque, until the head of the fastener, or an associated seal or gasket, engages the outside of the duct wall if inserted from the outside, or the bearing surface of the flange (if one flange) or the closest flange (if two flanges) and the fastener is inserted from the inside. Then, with further rotation, the thread will engage the flange next to the duct wall to bring it tightly thereagainst for securing the tie rod to the duct wall.

As a preferred configuration for a tie rod with two flanges at one or both ends, the holes through the flanges are generally aligned, defined as sufficiently aligned for entry of a fastener into both holes, with the flanges angularly related at an acute angle in one or more planes, or parallel, and with features of the internal edges bounding the holes, e.g., features comprising e.g., corners of an eye, diamond, teardrop, etc., shape, located for providing clearance for passage of a thread of the fastener therethrough without requiring forceably cutting either the thread or the edge surface bounding the holes, this being generally defined as requiring noticeably greater power output of a power tool used for fastening, which increases manual holding effort required as well as battery power usage if the tool is battery powered, or additional leverage if using an unpowered hand tool such as a wrench or screwdriver. This is advantageous as it reduces the torque necessary to thread the fastener through the holes prior to tightening the fastener to secure the tie rod in place. It is also advantageous as it allows more mis-alignment of the holes of adjacent ones of the flange or flanges and hole through the duct wall.

Optionally, the threaded fastener can be inserted at an acute angle to an axis through the center of the hole through the duct wall, that is, at a tilt relative to the duct wall, to facilitate ease of threading through that hole without cutting a thread, with the shank of the fastener also extending into the flange or flange at the tilt angle. The shapes of the hole(s) in the flange(s) can be oriented to facilitate greater clearance for this purpose and thus ease of rotation. The preferred threaded fastener will have a pitch that facilitates passage through each of the two or more members, i.e., the one or two flanges, and the duct wall, individually without forceable cutting or deforming them to significant extent, at least until the fastener is tightened. As a non-limiting example, the pitch can be about the thickness of the flange or flanges individually, or marginally larger, and also the duct wall, to facilitate easy rotation of the fastener simultaneously within two holes without requiring cutting, as taught in U.S. Pat. No. 10,544,891 B2, and additionally within the third hole, if the second flange is present.

As a further preferred aspect, at least one annular resilient seal member in the form of a gasket or washer will be disposed around the shank of the fastener adjacent to the fastener head which is larger transversely relative to the shank, so that the gasket will be located between the fastener head and the outer surface of the duct wall if installed from the exterior, or disposed against the surface of the flange, to provide a sealed condition to reduce or prevent air leakage around the fastener. To facilitate this, the fastener will preferably comprise a space or gap along the shank between the endmost thread and head, which gap or space will have a sufficient extent in the longitudinal direction to receive one of the flanges or the duct wall plus the gasket, so that the gasket is captured therebetween.

As an additional preferred aspect, the gap or space between the head and endmost thread will be large enough in the longitudinal direction, and the gasket can be sufficiently resilient, to allow tilting of the fastener in the holes initially. This is advantageous, as it can allow the threads of the fastener to disengage from the duct wall or flange when the fastener is fully received in the hole therethrough, and the fastener to pivot to a standing orientation more perpendicularly (aligned with axis X) within the hole in the duct wall, which pivoting action can be facilitated by localized resilient compression of the gasket when the fastener is tilted, while still allowing freer rotation of the fastener within that hole. The fastener can be automatically brought to a standing or more perpendicular orientation relative to the duct wall or immediately adjacent flange by receipt of the duct wall or flange within the gap. This can also result in some lateral shifting of the tie rod at this time to a position with the hole or holes of the flange or flanges more directly aligned with the hole through the duct wall.

With the duct wall or associated flange completely received in the gap between the thread and head of the fastener, with continued rotation of the fastener, the sole flange, or flange closest to the duct wall, will be drawn toward and eventually together and in abutment with the duct wall by the engagement with the thread of the fastener. When tight, this will secure the tie rod in position and compress the gasket to effect a seal about the fastener. With the fastener inserted from the outside, when the sole or closest flange is brought into sufficient contact with the inner surface of the duct wall, if the wall and flange are not parallel, further tightening of the fastener can be optionally applied with sufficient force to elastically or plastically deform, e.g., flex or bend that flange at the bend into surface-to-surface abutment for most secure and rigid attachment of the tie rod, that is, with no play therebetween and prevent further rotation of the fastener without cutting or deforming the flange and duct wall. This is advantageous if the flange was not bent to the exact mating angle originally, as will be expected for bends made at the job site. To facilitate, the feature between the flange and body of the tie rod can be configured to have sufficient reduced strength and/or elasticity to allow some limited bending by the force of the threading action of the fastener to achieve abutment, but this reduced strength/elasticity should be low enough that the rigidity of the structure in opposition to duct pressure conditions will not result in significant duct wall deflection. This elasticity can also contribute to holding the fastener against later rotation due to vibration, etc. In addition, there can be cutting or deforming of material between the thread and the associated flange during final tightening, to hold the fastener in position against vibration and other forces that could otherwise loosen it. This can be accomplished with a hand or power tool.

If a second flange is present, it will be drawn also toward the duct wall and the first flange by the further rotation, and can be configured to have sufficient elastically after initial bending, to act as a spring exerting a force F against the fastener thread to retain it in position in opposition to forces generated by vibration and other loosening forces that may be present. Alternatively, the second flange if present can be drawn into engagement with the first flange, including in elastic deformation to resiliently hold the fastener, or in plastic deformation, including with cutting and/or deformation of material by the threaded engagement, to mechanically fix the fastener in position. This configuration can also be advantageous if the first and second flanges are fixed with the final tightening of the fastener in spaced apart relation to each other, including at one or more acute angles to each other, to form a three-dimensional structure in cooperation with and about the fastener, it being understood that the first flange will be drawn in the longitudinal direction, followed at the spaced distance by the second flange which will remain some spaced distance from the first flange unless more strongly tightened, e.g., greater torque applied, which is not necessary in most cases. This can be advantageous as it increases the rigidity of the tie rod and duct wall assembly, and reduce energy consumption required for tightening. In this regard, the bending of the flanges into angular relation to the body of the tie rod stiffen the tie rod initially, and then tightening the fastener while threadedly engaged with the flanges brings them toward the duct wall, the closest flange engaging the duct wall including preferably in full abutment therewith, while the second flange can stand off from the first flange, e.g., by a small fraction of an inch, e.g., $1/32$th inch; $1/16$th inch, or more, either fully or partially, e.g., some partial contact between the flanges, with there being remaining resiliency in the second flange to act as a spring to exert a resilient force against the fastener to resist rotation. Thus, it can be envisioned that the three-dimensional configuration of the fastener and flanges function together as a more rigid, integrated structural system for stiffening the end of the tie rod and the assembly with the duct wall to prevent or at least substantially limit deflection from air pressure variations.

As another preferred aspect, the flange or flanges can be intentionally bent at an acute angle to the duct wall, and to each other if more than one, or the outermost flange (or the sole flange) can be flush in surface-to-surface abutment with the duct wall, or (preferred) in contact with but not in surface-to surface-abutment, so that the hole of the flange is slightly spaced from the duct wall and angularly oriented thereto. In this regard, it can be the outer edge or free end of the flange that is in contact, or the near or proximal end, for comparable effect. If two flanges are employed, which is the most preferred configuration, the flanges can be spaced apart in the longitudinal direction as just discussed, and at an acute angle or angles to each other, that is, forming an acute angle therebetween, in one or more planes. To facilitate this longitudinal spacing in the nestable tie rod configuration wherein the flanges are bent later such as at the job site, the features to make bending easier for the respective flanges can be located at a desired longitudinal distance apart, as a non-limiting example, the $1/32$th inch; $1/16$th inch, or more, mentioned above. Then, the fastener is tightened to bring and hold the proximal (closest) flange surface, e.g., bearing surface, tightly against the duct wall to secure the tie rod in place. The large screw or bolt of U.S. Pat. No. 10,544,891 B2 is preferred as the fastener, as once the head is in abutment with the duct wall, the duct wall will be located within the space or gap next to the fastener head, to allow free rotation. That fastener is strong, holds the tie rod tight, and includes a feature associated with the endmost thread to prevent removal or loosening, particularly from vibration such as can be present in HVAC ducts.

Alternatively, it is recognized that one or more other threaded fasteners, including with or without nuts, can be used, or a conventional sheet metal screw or screws for the attachment, with tightness being achieved by the passing through and resilient bringing closer together of the overlapping flanges. As another alternative, the hole in the duct wall can be the same as or larger than the major diameter of the fastener shank, to allow insertion therethrough without threaded engagement therewith, and tightening by engagement with a nut. As another alternative, the hole through the duct wall can have any of the above-identified shapes to allow passage of the threaded portion of the fastener therethrough without forming a thread or cut in the internal edge surface. This is advantageous to facilitate ease and speed of attachment and reduce the torque necessary for installing the fastener. Then, when the fastener is fully received in the duct wall hole so that the fastener head or associated gasket is in abutment with the duct wall or with an integral attachment flange, such that the shank of the fastener extends through the other of the duct wall or flange or flanges, further tightening of the fastener will bring the flange or flanges and duct wall together, such that the fastener thread will bear thereagainst, to hold the assembly together, as explained above.

It can be understood that the ability of the fasteners at the opposite ends of the tie rod be securely retained to prevent loosening from vibration and other normal condition, is advantageous. That is, if the fasteners, once fully engaged cannot be removed, then because they are at both ends, the tie rod cannot be removed, as it is captured between the two fasteners. As an additional preferred feature and advantage of the screw or bolt of U.S. Pat. No. 10,544,891 B2 to the present invention, it has a special configuration wherein the endmost thread is operable to prevent, or obstruct or interfere with, removal of the screw from the duct wall and tie rod, whether the fastener is tight or not. In its simplest form, this special configuration includes a surface on the endmost thread bounding the space between the head and endmost thread, which is at least generally parallel to the opposing surface of the head and is shaped so as to partially obstruct the groove between the endmost thread and the next adjacent thread of the threaded portion of the screw to prevent re-entry of the duct wall or associated flange into the groove. As another non-limiting example, the endmost thread can extend into the groove toward the next adjacent thread head at a steeper angle than the normal pitch angle of the thread. As another example, the end of the endmost thread can have bulbous or similar shape that prevents re-engagement of the thread, such as a teardrop or partial teardrop shape. As a non-limiting example, to provide the above capabilities, a substantial portion, e.g., 20 to 40 percent of the endmost thread can be generally flat and parallel to the opposing surface of the head, and bounds the space so as to form a bearing surface for opposing forces exerted between the endmost thread and an opposing surface of a duct wall or flange located in the adjacent space, that combined with forces exerted between the opposite surface of the duct wall or flange and the screw head, will be sufficient to hold the screw in the desired substantially perpendicular orientation relative to the duct wall/flange under anticipated conditions, e.g., forces exerted thereagainst by vibration, etc.

In regard to transitioning of the fastener from the tilted to the perpendicular orientation, the endmost thread is configured to be robust so as to accomplish the transition, e.g., with a pivotal or leveraged movement, without bending or breaking, and without application of a substantial force, and the occurrence of the transition can serve to signal the operator of a screw gun or other automatic or powered rotation tool or driver that the screw has achieved the fully engaged position in the duct wall or flange, along with the sensation and/or sound that the screw is rotating freely within that member. The change from tilted to perpendicular may also be observed as a visual cue.

According to another preferred aspect of the invention, the large screws or bolts of U.S. Pat. No. 10,544,891 B2 can include a variety of tips on the shanks thereof. As a non-limiting example, a tapered or pointed, non-threaded and non-drilling tip can be provided on the screw, configured to serve as a pilot received in a pre-existing hole in the duct wall or flange. As another non-limiting example, the screw or bolt can have a more blunt self-drilling tip, in the manner of a hollow hole cutting drill or trepanning bit, so as to have the capability of both drilling through the flange or duct wall and serving as a pilot for aligning purposes. As still another non-limiting alternative, the screw can have a conventional spade type or tapered threaded tip typically found on commercially available Tek screws for sheet metal applications. For the latter two examples, an existing hole through a duct wall or flange can be used as a drill guide, for controlling location of additional holes through a flange or flanges, or associated duct wall to prevent walk-off when drilling.

BRIEF DESCRIPTION OF THE DRAWINGS

FIG. 1 is a compendium of known prior art tie rod configurations;

FIG. 2 is a side view of a tie rod according to the invention;

FIG. 2a is an end view of the tie rod of FIG. 2;

FIG. 4 is a side view of a stamped cutting of a tie rod of the invention before bending into final shape;

FIG. 5 is a side fragmentary sectional view of a tie rod of the invention abutting a duct wall, showing a threaded fastener inserted through a hole through the duct wall and partially threadedly engaged with integral attachment flanges of the tie rod;

FIG. 5a shows an attachment flange of the invention with one exemplary embodiment of a hole therethrough;

FIG. 5b shows an attachment flange of the invention with another exemplary embodiment of a hole therethrough;

FIG. 5c shows an attachment flange of the invention with another exemplary embodiment of a hole therethrough;

FIG. 5d shows an attachment flange of the invention with another exemplary embodiment of a hole therethrough;

FIG. 5e shows an attachment flange of the invention with another exemplary embodiment of a hole therethrough;

FIG. 5f shows an attachment flange of the invention with another exemplary embodiment of a hole therethrough;

FIG. 5g shows an attachment flange of the invention with another exemplary embodiment of a hole therethrough;

FIG. 5h shows an attachment flange of the invention with another exemplary embodiment of a hole therethrough;

FIG. 5i shows an attachment flange of the invention with another exemplary embodiment of a hole therethrough;

FIG. 5j shows an attachment flange of the invention with another exemplary embodiment of a hole therethrough;

FIG. 5k shows an attachment flange of the invention with still another exemplary embodiment of a hole therethrough;

FIG. 10 is a side view of a representative tie rod of the invention, showing integral attachment flanges thereof extending longitudinally before bending and associated features at a predetermined location to facilitate bending, and an end view of the tie rod showing a representative integral attachment flange bent at the features to a transverse angle relative to the tie rod;

FIG. 10a is another side view of a representative tie rod of the invention, showing integral attachment flanges thereof extending longitudinally before bending and a variant of associated features at a predetermined location to facilitate bending, and an end view of the tie rod showing a representative integral attachment flange bent at the features to a transverse angle relative to the tie rod;

FIG. 10b is another side view of a representative tie rod of the invention, showing integral attachment flanges thereof extending longitudinally before bending and another variant of associated features at a predetermined location to facilitate bending, and an end view of the tie rod showing a representative integral attachment flange bent at the features to a transverse angle relative to the tie rod;

FIG. 10c is another side view of a representative tie rod of the invention, showing integral attachment flanges thereof extending longitudinally before bending and another variant of associated features at a predetermined location to facilitate bending, and an end view of the tie rod showing a representative integral attachment flange bent at the features to a transverse angle relative to the tie rod;

FIG. 10d is another side view of a representative tie rod of the invention, showing integral attachment flanges thereof extending longitudinally before bending and still another variant of associated features at a predetermined location to facilitate bending, and an end view of the tie rod showing a representative integral attachment flange bent at the features to a transverse angle relative to the tie rod;

FIG. 11 shows side views of a flat body embodiment of a tie rod of the invention;

DETAILED DESCRIPTION OF PREFERRED EMBODIMENTS OF THE INVENTION

Figure 3A:
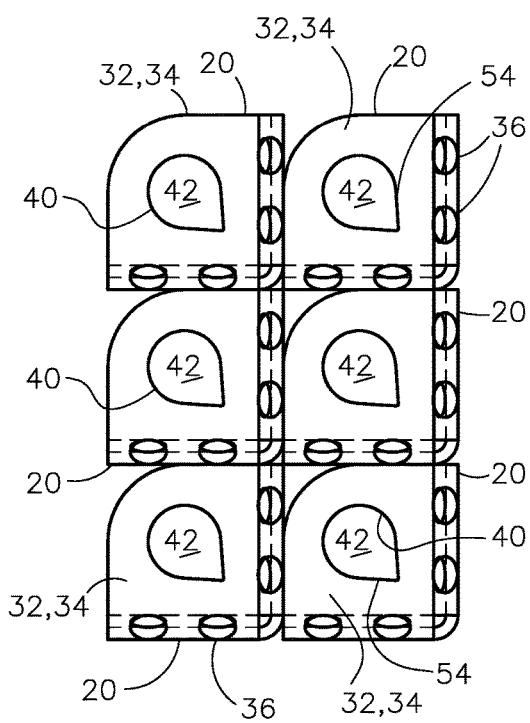
FIG. 3a is an end view of a nested quantity of another embodiment of tie rods of the invention.
Figure 3B:
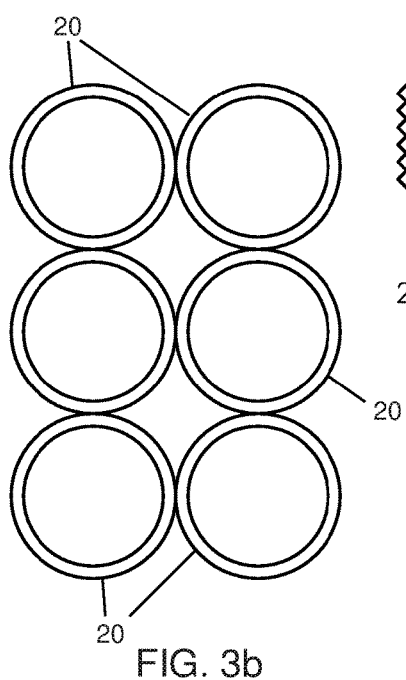
FIG. 3b is an end view of a nested quantity of still another embodiment of tie rods of the invention.
Figure 3:
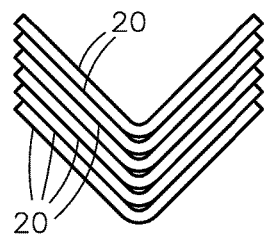
FIG. 3 is an end view of a nested quantity of tie rods of the invention.

Referring to FIGS. 1-20 of the drawings, wherein like numbers refer to like parts, several embodiments of a tie rod the invention are shown. Referring particularly to FIGS. 2-5k, a basic configuration of a tie rod 20 of the invention is shown, along with several optional hole configurations for receiving a fastener for attaching to a duct wall 22, that can be provided in a ready to use configuration, see FIGS. 2 and 2a, or a stackable shipping and storage configuration, see FIGS. 3, 3a, 3b, and 4. The tie rods 20 of the invention can be simply and inexpensively fabricated from sheet metal or other suitable material, including automatically, and are securely fastenable quickly and easily to duct walls 22, see FIGS. 7, 8, 9, 12-20, optionally by one person, without need of tightening nuts and bolts together from inside and outside of the duct 24, although that is an option, see FIG. 17. Optionally, the tie rod 20 can be fabricated in one of several straight, nestable configurations (FIGS. 3-4), that is tightly stackable, to save storage and shipping space. The typical tie rod 20 of the invention will have an elongate body 30 having opposite longitudinal ends 26 and 28 with at least one integral attachment flange 32 and/or 34 integrally attached to or formed with body 30, bent to a transverse orientation or angle relative to the longitudinal direction of body 30, for attaching to the duct walls 22.

Figure 6:
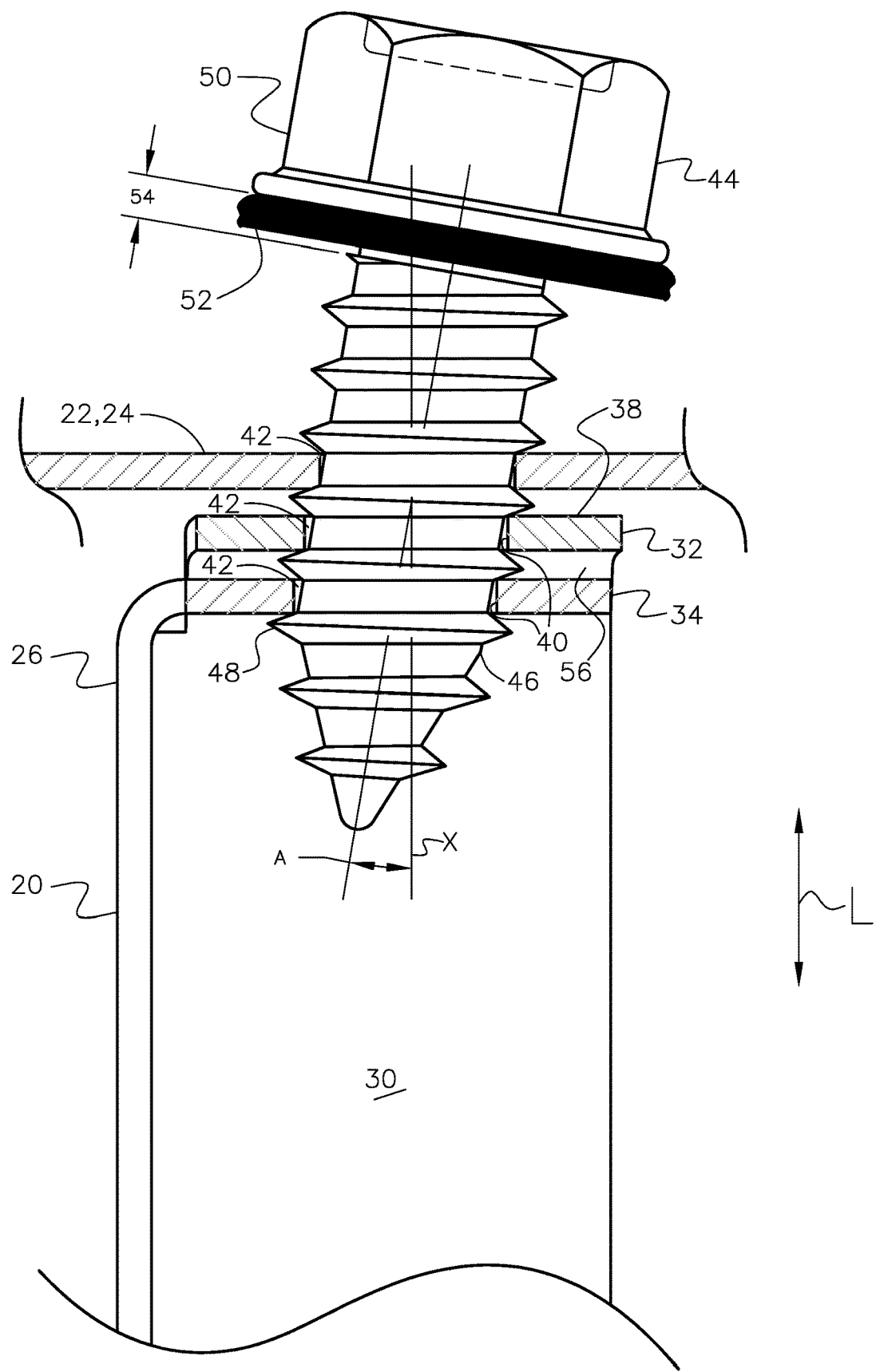
FIG. 6 is a fragmentary sectional view of a tie rod of the invention with an attachment flange thereof positioned in spaced relation to the interior surface of a duct wall, showing a threaded fastener inserted through holes through the duct wall and flange and partially threadedly engaged with the flange and with a second attachment flange of the tie rod.
Figure 7:
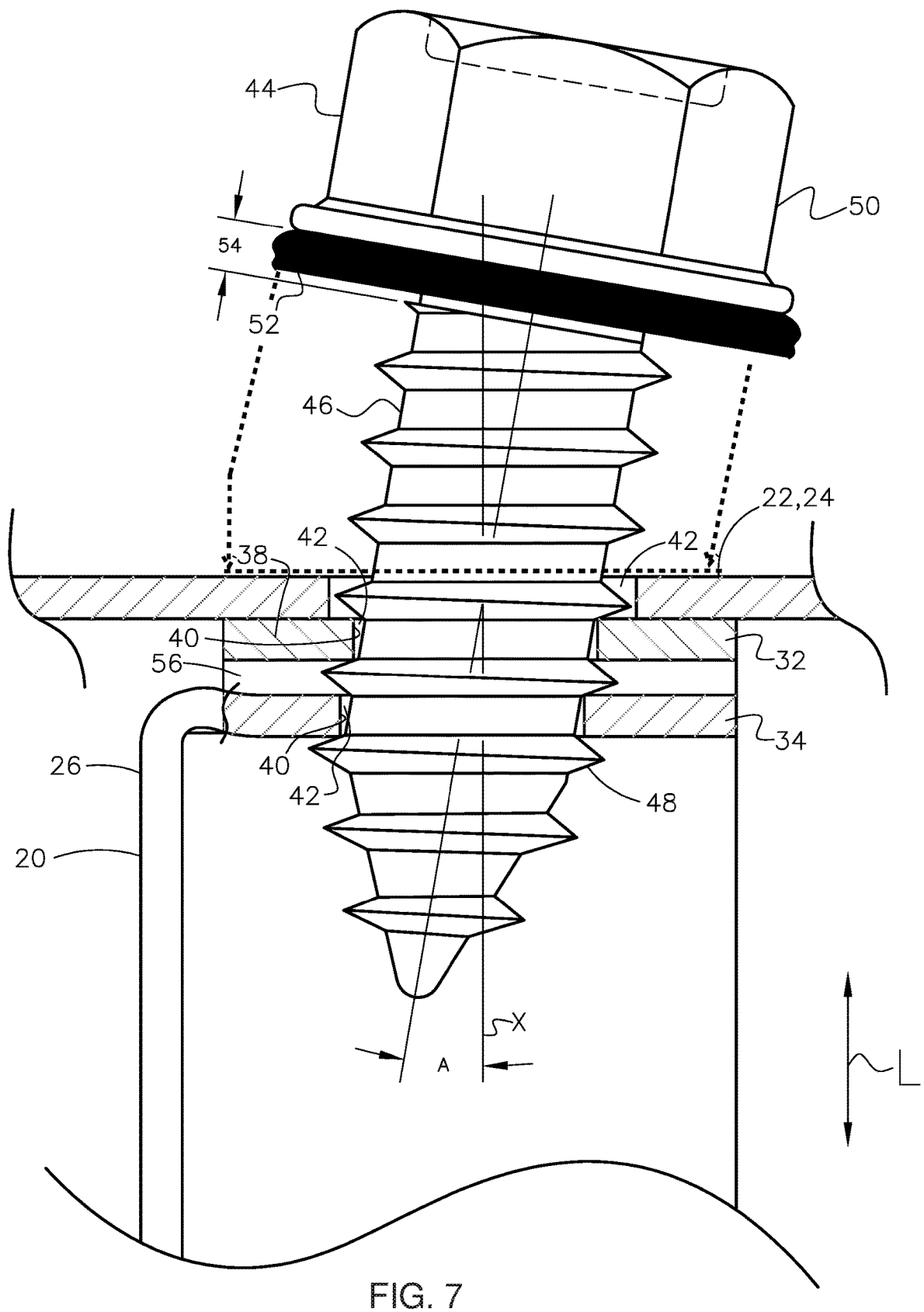
FIG. 7 is another fragmentary sectional view of the tie rod of FIG. 6, with an attachment flange thereof brought into abutment to the interior surface of the duct wall by virtue of further threaded engagement with the first flange.

Elongate body 30 is preferably of one piece, sheet metal or plastics construction, comprising a V-, C-, L-, tubular, or flat cross sectional shape terminating at the opposite longitudinal ends 26, 28, each with at least one integral attachment flange 32 or 34 originally parallel to the longitudinal direction L of body 30 and that is then bent transverse to the longitudinal direction L (see representative pliers jaw grasping one of the flanges to manually bend it in FIG. 4, and finished bent in FIGS. 6 and 7 parallel to an axis X), used for attaching to a duct wall 22. The at least one integral attachment flange 32, 34 can be formed, e.g., bent, to the transvers angle to the longitudinal direction L at the time of fabrication, or can be bent to that angle at the job site or elsewhere, which provides advantages including making final length and/or angle adjustment if necessary, and allowing the tie rod to be stored and shipped in a straight, unbent configuration which facilitates nesting multiple tie rods together in a stack or array for space savings. To facilitate later bending, the tie rod can include bending features 36, e.g., holes in FIG. 4, at the bending location that make bending easier so as to be manually accomplished, alone or with simple hand tools such as a pliers, vise grips, or the like, which bending features 36 can comprise as non-limiting examples, a hole or holes (FIGS. 4, 10) or a pre-scored line or lines (FIGS. 10a, 10d), a groove or grooves (FIG. 10b), or cut in the tie rod along the bend location only (FIG. 10d) so as to not otherwise weaken the tie rod against bending or deformation forces. In this latter regard, features 36 should not be sufficiently weakened that contemplated air pressures exerted against the duct wall 22 will be sufficient to flex the tie rod 20, and particularly the flanges 32, 34, to any significant extent under expected loading conditions during operation of the duct, e.g., pressurized air contained therein. Fabrication of the tie rod body 30 can be by any suitable metal forming process, such as stamping and bending from sheet metal, or laser cutting or plasma cutting from sheet metal and bending, or the like.

Figure 8:
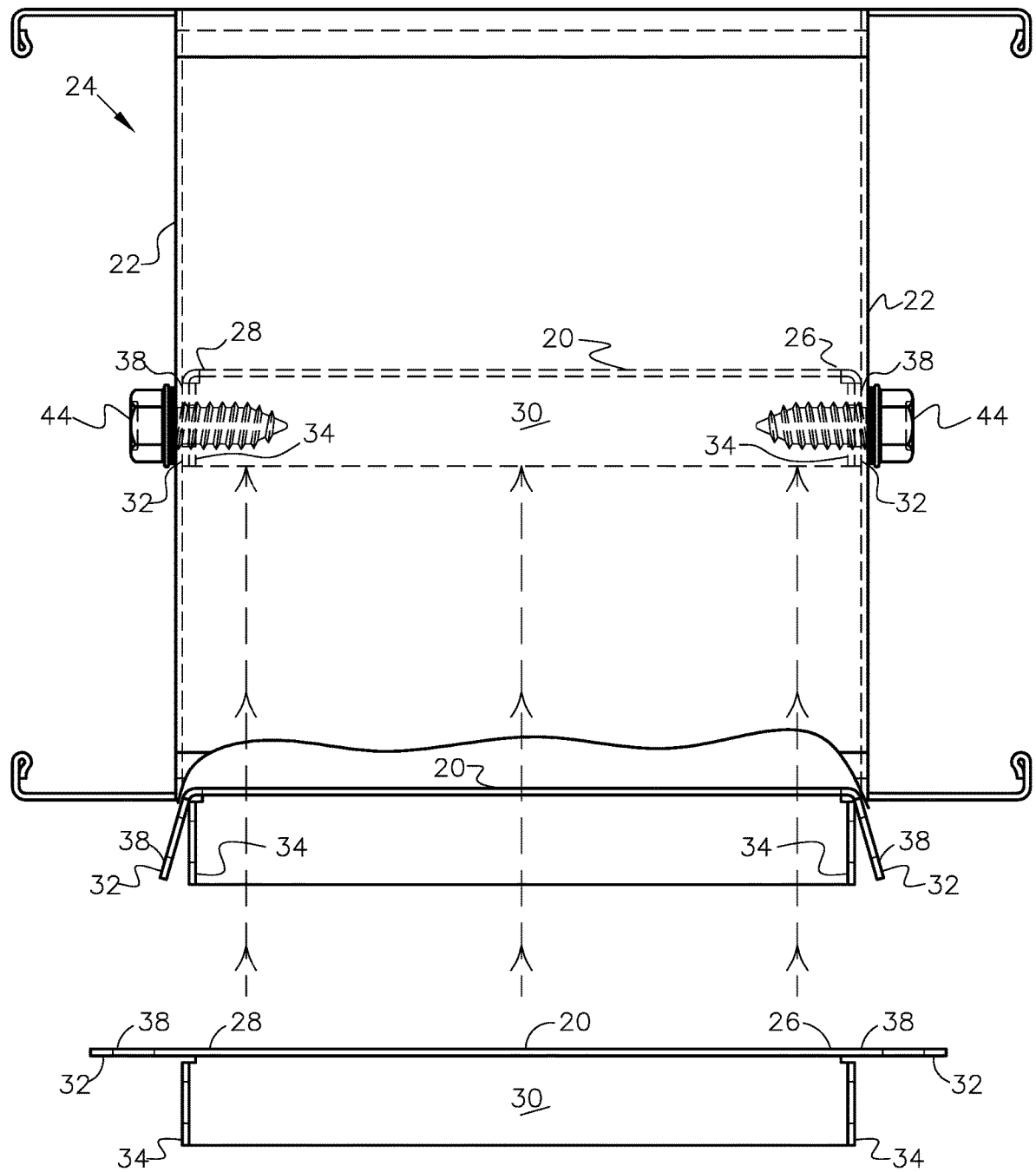
FIG. 8 is an end representation of a typical duct, showing installation of a tie rod of the invention between opposing duct walls, with outermost attachment flanges being bent during the installation, and with threaded fasteners securing the opposite ends of the tie rod to the duct walls.

As an optional configuration, as shown in FIG. 8, the tie rod can be constructed with its inner flange 34 bent to the transverse angle prior to installation, and outer flange 32 still straight, to be bent by forceably inserting the tie rod into the duct 24. This can be advantageous to bend the flange 34 to the exact dimension of the duct, for a tighter, snug fit. The forces required can be of a magnitude to require tapping or hammering the tie rod into the duct interior with a mallet or hammer for installation, to ensure that the duct wall is maintained in position against deflection by air pressure conditions. There can also be a degree of retained elasticity in flange 32, so as to be spring loaded against the duct wall 22.

As another preferred aspect, the integral attachment flange 32, 34 at the end of the tie rod 20 if just one is used, or a longitudinally endmost one of the integral attachment flanges 32, 34 if there is more than one per end, has a longitudinally outwardly facing bearing surface 38 positioned and oriented to bear against a duct wall 22. Each integral attachment flange 32, 34 additionally has an internal edge surface 40 bounding and defining a hole 42 or aperture through the flange configured to receive a fastener, preferably a threaded fastener, and most preferably a large screw or bolt as disclosed in Fischer U.S. Pat. No. 10,544,891 B2, the disclosure of which is hereby incorporated herein by reference in its entirety.

The hole 42 in the flange or flanges 32, 34 as well as in duct wall 22, can have any of the shapes disclosed in U.S. Pat. No. 10,544,891 B2, namely, diamond shaped, teardrop, eye, oval, rectangular, round, or a composite of the shapes, as well as other shapes that provide the below described functionality. The nominal size of the hole 42 is preferably marginally larger than the root diameter of the threaded shank 46 of the threaded fastener 44 but smaller than the major diameter thereof, and is itself unthreaded, but, which combined with the shape, allows the fastener 44 to be threadedly received in and threadedly engage edge surface 40 bounding the hole 42 while passing therethrough, without the fastener thread significantly cutting or deforming the internal edge surface 40, or the edge 40 cutting the thread. This is desirable as will be explained, as it allows rotating passage of the thread 48 of the fastener 44 through the hole 42 with minimal torque, until the head 50 of the fastener 44 or an associated seal or gasket 52, engages the outside of the duct wall 22 if inserted from the outside, or the bearing surface of the flange 32 (if one flange) or the closest flange 32, 34 (if two flanges) and the fastener 44 is inserted from the inside. Then, with further rotation, the thread 48 will threadedly engage the flange 32 next to the duct wall to bring it tightly thereagainst for securing the tie rod 20 to the duct wall 22.

As a preferred configuration for a tie rod 20 with two flanges 32, 34 at each end, the holes 42 through the flanges 32, 34 are generally aligned, defined as sufficiently aligned for entry of a fastener 44 into both holes 42, with the flanges 32, 34 angularly related at an acute angle in one or more planes, or parallel, and with features 54 of the internal edges 40 bounding the holes, e.g., features 54 comprising e.g., corners of an eye, diamond, teardrop, etc., shape, located for providing clearance for passage of a thread 48 of the fastener 44 therethrough without requiring forceably cutting either the thread 48 or the unthreaded edge surface 40 bounding the holes 42. This is advantageous as it reduces the torque necessary to thread the fastener 44 through the holes 42 prior to tightening the fastener 42 to secure the tie rod 20 in place.

It is also advantageous as it allows more mis-alignment of the holes 42 of adjacent ones of the flange or flanges 32, 34 and hole 42 through the duct wall 22.

Optionally, the threaded fastener 44 can be inserted at an acute angle A (FIGS. 5, 6 and 7) to an axis X through the center of the hole 42 through the duct wall 22, that is, at a tilt relative to the duct wall 22, to facilitate ease of threading through that hole without cutting a thread, with the shank 46 of the fastener 44 also extending into the flange or flange 32, 34 at the tilt angle. The shapes of the hole(s) 42 in the flange(s) 32, 34 can be oriented to facilitate greater clearance for this purpose and thus ease of rotation, as can be envisioned, see FIGS. 5a, 5b—minor diameter of threaded fastener shown in hole in FIG. 5b, major diameter beyond edge of hole, see FIG. 5. The preferred threaded fastener 44 will have a pitch that facilitates passage through each of the two or more members, i.e., the one or two flanges 32, 34 and the duct wall 22, individually without forceable cutting or deforming them to significant extent, at least until the fastener 44 is tightened. As a non-limiting example, the pitch can be about the thickness of the flange or flanges 32, 34 individually, or marginally larger, and also the duct wall 22, to facilitate easy rotation of the fastener 44 simultaneously within two holes 42 without requiring cutting, as taught in U.S. Pat. No. 10,544,891 B2, and additionally within the third hole 42, if the second flange 34 is present.

As a further preferred aspect, as shown in FIGS. 6 and 7, an annular resilient seal member in the form of a gasket or washer 52 will be disposed around the shank 46 of the fastener 44 adjacent to the fastener head 50 which is larger transversely relative to the shank 46, so that the gasket 52 will be located between the fastener head 50 and the outer surface of the duct wall 22 if installed from the exterior, or disposed against the surface of the flange 32 or 34, to provide a sealed condition to reduce or prevent air leakage around the fastener 44. To facilitate this, the fastener 44 will preferably comprise a space or gap 56 along the shank 46 between the endmost thread and head 50, which gap or space 56 will have a sufficient extent in the longitudinal direction (along axis X) to receive one of the flanges 32, 34 or the duct wall 22 plus the gasket 52, so that the gasket 52 is captured therebetween, see FIGS. 6 and 7.

Preferably, the gap or space 56 between the head 50 and endmost thread will be large enough in the longitudinal direction, and the gasket 52 can be sufficiently resilient, to allow tilting of the fastener 44 in the holes 42 initially. This is advantageous, as it can allow the threads 48 of the fastener 44 to disengage from the duct wall 22 or flange 32, 34 when the fastener 44 is fully received in the hole 42 therethrough, and the fastener 44 to pivot to a standing orientation more perpendicularly (aligned with axis X) within the hole 42 in the duct wall 22, which pivoting action can be facilitated by localized resilient compression of the gasket 52 when the fastener 44 is tilted, while still allowing freer rotation of the fastener 44 within that hole 42. The fastener 44 can be automatically brought to a standing or more perpendicular orientation relative to the duct wall 22 or immediately adjacent flange e.g., flange 32, by receipt of the duct wall 22 or flange within the gap 56. This can also result in some lateral shifting of the tie 20 rod at this time to a position with the hole or holes 42 of the flange or flanges 32, 34 more directly aligned with the hole 42 through the duct wall 22.

Figure 9:
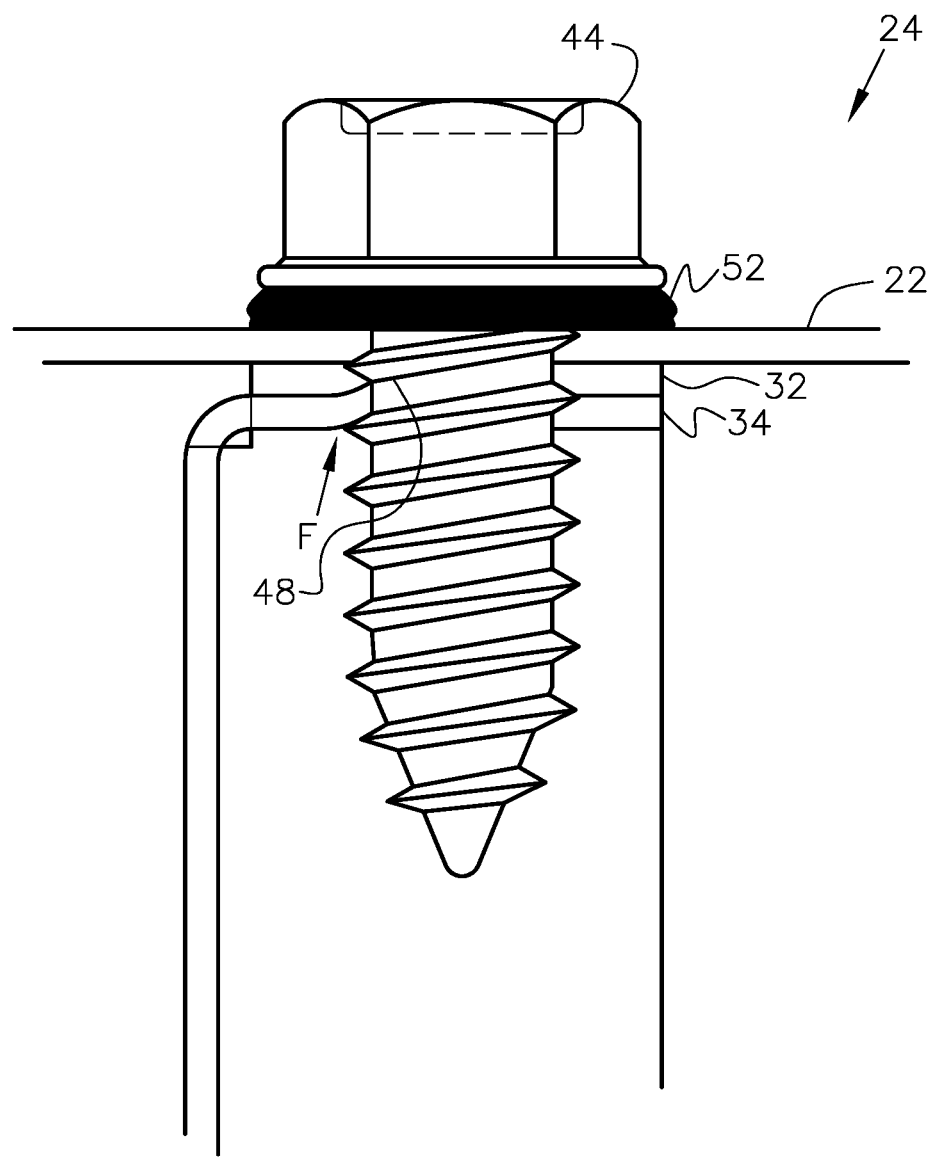
FIG. 9 is another representation of a duct wall, showing an end of a tie rod and abutment thereto, and attached thereto with a threaded fastener fully threadedly received within holes through attachment flanges of the tie rod.

With the duct wall 22 or associated flange 32, 34 completely received in the gap 56 between the thread 48 and head 50 of the fastener 44, with continued rotation of the fastener, the sole flange, or flange closest to the duct wall 22, will be drawn toward and eventually together with the duct wall 22 by the engagement with the thread 48 of the fastener, as illustrated in FIGS. 8 and 9. When tight, this will secure the tie rod 20 in position and compress the gasket 52 to effect a seal about the fastener 44. Here, it can be observed that with the fastener 44 inserted from the outside, when the sole or closest flange 32, 34 is brought into sufficient contact with the inner surface of the duct wall 22, if the wall and flange are not parallel, further tightening of the fastener 44 can be optionally applied with sufficient force denoted by arrow F in FIG. 9, to elastically or plastically deform, e.g., flex or bend that flange at the bend into surface-to-surface abutment for most secure and rigid attachment of the tie rod 20—that is, with no play therebetween and prevent further rotation of the fastener 44 without cutting or deforming the flange and duct wall. This is advantageous if the flange was not bent to the exact mating angle originally, as will be expected for bends made at the job site. To facilitate, the feature 36 between the flange 32, 34 and body 30 of the tie rod 20 can be configured to have sufficient reduced strength and/or elasticity to allow some limited bending by the force of the threading action of the fastener 44 to achieve abutment, but this reduced strength/elasticity should be low enough that the rigidity of the structure in opposition to duct pressure conditions will not result in significant duct wall deflection. This elasticity can also contribute to holding the fastener 44 against later rotation due to forces generated by vibration, etc. In addition, there can be cutting or deforming of material between the thread and the associated flange during final tightening, to hold the fastener in position against vibration and other forces that could otherwise loosen it. This can be accomplished with a hand or power tool.

If a second flange 34 is present, it will be drawn also toward the duct wall 22 and the first flange 32 by the further rotation, and can be configured to have sufficient elastically after initial bending, to act as a spring exerting force F against the fastener thread 48 to retain it in position against vibration and other loosening forces that may be present, see FIG. 9. Alternatively, the second flange 34 if present can be drawn into engagement with the first flange 32, including in elastic deformation to resiliently hold the fastener 44, or plastic deformation, including with cutting and/or deformation of material by the threaded engagement, to mechanically fix the fastener 44 in position. This configuration can also be advantageous if the first and second flanges 32, 34 are fixed with the final tightening of the fastener 44, in spaced apart relation to each other, including at one or more acute angles to each other, to form a three-dimensional structure in cooperation with and about the fastener 44, as best shown in FIGS. 6 and 7, FIG. 6 showing the flange 32 in abutment with the duct wall 22, and FIG. 7 showing it spaced therefrom during the initial threading, it being understood that the flange 32 will be drawn in the longitudinal direction L (small black arrow), followed at the spaced distance by flange 34 which will remain some spaced distance from flange 32 unless more strongly tightened, e.g., greater torque applied, which is not necessary in most cases. In other words, while the flange 32 is brought into abutment with the inner surface of the duct wall as shown, and the gasket 52 or head of the fastener brought to bear against the outer duct surface, see dotted line in FIG. 7, the other flange 34 will remain spaced from the flange 32, and optionally elastically so, to reduce the possibility of loosening from vibration. This can be advantageous as it increases the rigidity of the tie rod 20 and duct wall 22 assembly, and reduce energy consumption required for tightening. In this regard, the bending of the flanges 32, 34 into angular relation to the body 26 of the tie rod 20 stiffen the tie rod initially, and then tightening the fastener 44 while threadedly engaged with the flanges brings them toward the duct wall 22, the closest flange 32 engaging the duct wall including preferably in full abutment therewith, while the second flange 34 can stand off from the first flange 32, e.g., by a small fraction of an inch, e.g., $\frac{1}{32}$th inch; $\frac{1}{16}^{th}$ inch, or more, either fully or partially, e.g., some partial contact between the flanges, with there being remaining resiliency in the second flange 34 to act as a spring to exert a resilient force against the fastener 44 to resist rotation. Thus, it can be envisioned that the three-dimensional configuration of the fastener 44 and flanges 32, 34 function together as a more rigid, integrated structural system for stiffening the end of the tie rod 20 and the assembly with the duct wall 22 to prevent or at least substantially limit deflection from air pressure variations.

As another preferred aspect, the flange or flanges 32, 34 can be intentionally bent at an acute angle to the duct wall 22, and to each other if more than one, or the outermost flange (or the sole flange) can be flush in surface-to-surface abutment with the duct wall 22, or (preferred) in contact with but not in surface to surface-abutment, so that the hole 42 of the flange is slightly spaced from the duct wall and angularly oriented thereto. In this regard, it can be the outer edge or free end of the flange that is in contact, or the near or proximal end, for comparable effect. If two flanges are employed, which is the most preferred configuration, the flanges can be spaced apart in the longitudinal direction as just discussed, and at an acute angle or angles to each other, that is, forming an acute angle therebetween, in one or more planes. To facilitate this longitudinal spacing in the nestable tie rod configuration wherein the flanges 32, 34 are bent later such as at the job site, the features 36 to make bending easier for the respective flanges 32, 34 can be located at a desired longitudinal distance D apart (FIG. 4), as a non-limiting example, the $\frac{1}{32}$th inch; $\frac{1}{16}^{th}$ inch, or more, mentioned above. Then, the fastener 44 is tightened to bring and hold the proximal (closest) flange surface, e.g., bearing surface 38, tightly against the duct wall 22 to secure the tie rod 20 in place. The large screw or bolt of U.S. Pat. No. 10,544,891 B2 is preferred as the fastener 44, as once the head 50 is in abutment with the duct wall 22, the duct wall 22 will be located within the space or gap 56 next to the fastener head 50, to allow free rotation. That fastener is strong, holds the tie rod tight, and includes a feature associated with the endmost thread 48 to prevent removal or loosening, particularly from vibration such as can be present in HVAC ducts.

Alternatively, it is recognized that one or more other threaded fasteners 44, including with or without nuts, can be used, or a conventional sheet metal screw or screws for the attachment. As another alternative, the hole 42 in the duct wall 22 can be the same as or larger than the major diameter of the fastener shank 46, to allow insertion therethrough without threaded engagement therewith, as illustrated in FIGS. 6 and 7. As another alternative, the hole 42 through the duct wall 22 can have any of the above-identified shapes to allow passage of the threaded portion of the fastener therethrough without forming a thread or cut in the internal edge surface 40. This is advantageous to facilitate ease and speed of attachment and reduce the torque necessary for installing the fastener 44. Then, when the fastener 44 is fully received in the duct wall hole 42 so that the fastener head 50 or associated gasket 52 is in abutment with the duct wall 22 or with an integral attachment flange 32, 34, such that the shank 46 of the fastener 44 extends through the other of the duct wall or flange or flanges, further tightening of the fastener 44 will bring the flange or flanges and duct wall together, such that the fastener thread will bear thereagainst, to hold the assembly together, as explained above.

It can be understood as illustrated in FIG. 8 that the ability of the fasteners 44 at the opposite ends of the tie rod 20 be securely retained to prevent loosening from vibration and other normal condition, is advantageous. That is, if the fasteners 50, once fully engaged cannot be removed, then because they are at both ends, the tie rod 20 cannot be removed, as it is captured between the two fasteners 44. As an additional preferred feature and advantage of the screw or bolt of U.S. Pat. No. 10,544,891 B2 to the present invention, it has a special configuration wherein the endmost thread is operable to prevent, or obstruct or interfere with, removal of the screw from the duct wall and tie rod, whether the fastener is tight or not. In its simplest form, this special configuration includes a surface on the endmost thread bounding the space between the head and endmost thread, which is at least generally parallel to the opposing surface of the head and is shaped so as to partially obstruct the groove between the endmost thread and the next adjacent thread of the threaded portion of the screw to prevent re-entry of the duct wall or associated flange into the groove. As another non-limiting example, the endmost thread can extend into the groove toward the next adjacent thread head at a steeper angle than the normal pitch angle of the thread. As another example, the end of the endmost thread can have bulbous or similar shape that prevents re-engagement of the thread, such as a teardrop or partial teardrop shape. As a non-limiting example, to provide the above capabilities, a substantial portion, e.g., 20 to 40 percent of the endmost thread can be generally flat and parallel to the opposing surface of the head, and bounds the space so as to form a bearing surface for opposing forces exerted between the endmost thread and an opposing surface of a duct wall or flange located in the adjacent space, that combined with forces exerted between the opposite surface of the duct wall or flange and the screw head, will be sufficient to hold the screw in the desired substantially perpendicular orientation relative to the duct wall/flange under anticipated conditions, e.g., forces exerted thereagainst by vibration, etc.

In regard to transitioning of the fastener 44 from the tilted to the perpendicular orientation, the endmost thread is configured to be robust so as to accomplish the transition, e.g., with a pivotal or leveraged movement, without bending or breaking, and without application of a substantial force, and the occurrence of the transition can serve to signal the operator of a screw gun or other automatic or powered rotation tool or driver that the screw has achieved the fully engaged position in the duct wall or flange, along with the sensation and/or sound that the screw is rotating freely within that member. The change from tilted to perpendicular may also be observed as a visual cue.

Each of FIGS. 10-10d shows a side view and an end view of a representative tie rod 20 having a variety of optional shapes of edges 40 forming holes 42, as well as optional configurations for bending features 36 on opposite ends 28 of body 30, e.g., holes (FIG. 10), cuts or notches (FIGS. 10a, 10b), scoring line/cut (FIG. 10d).

FIG. 11 shows a tie rod 20 having a flat elongate body 30 with ends 26, 28 having single integral attachment flanges 32 with bearing surfaces 38, and any of the hole 42 configurations shown elsewhere in the drawings.

Figure 12:
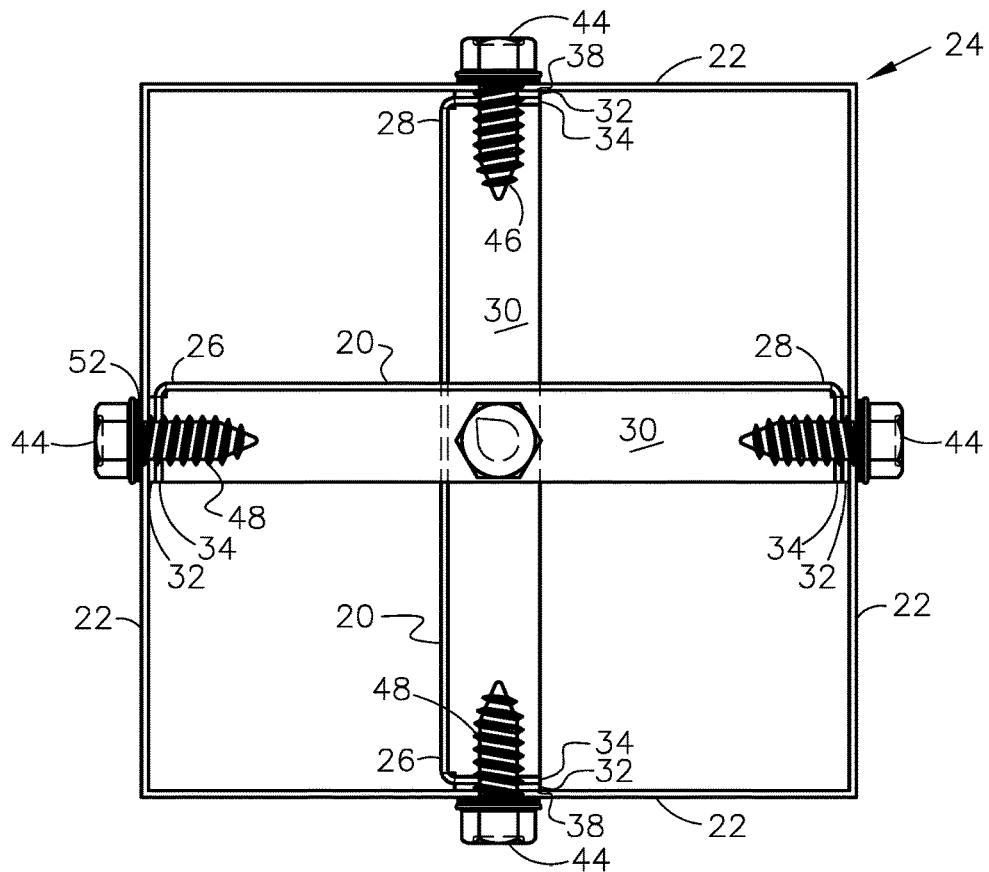
FIG. 12 is an end representation of a duct, showing installation of two tie rods of the invention in a cross configuration between opposing duct walls, with attachment flanges secured to the duct walls by threaded fasteners.
Figure 13:
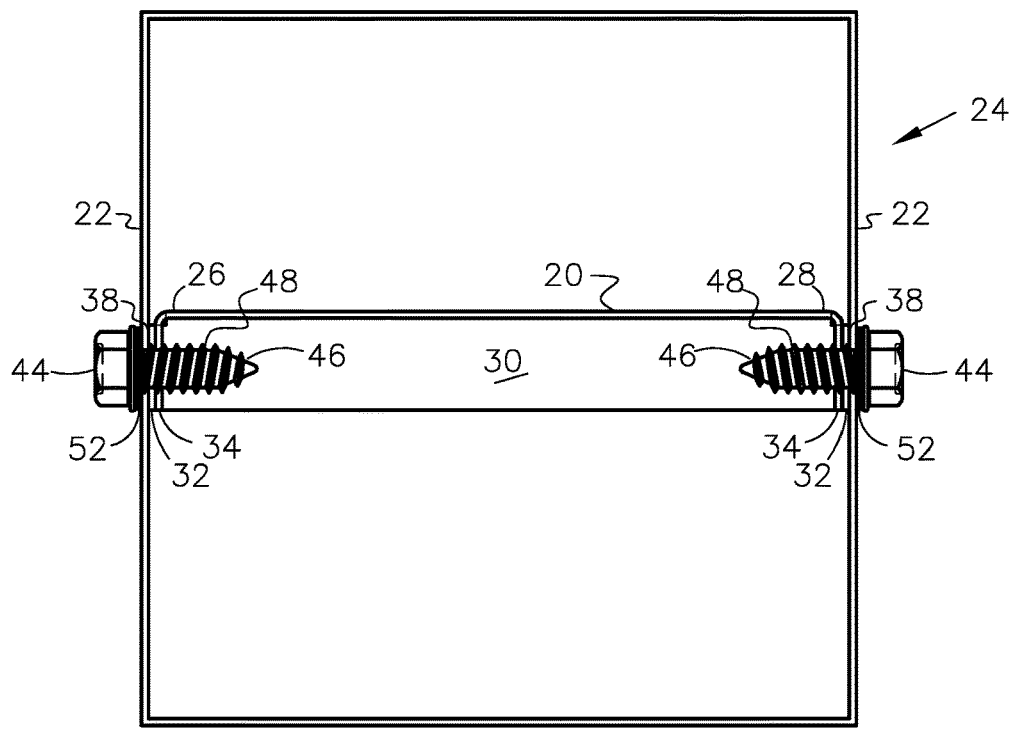
FIG. 13 is another end representation of a duct, showing installation of a tie rod of the invention, with attachment flanges secured to the duct walls by threaded fasteners.

FIGS. 12-15 shows several alternative installation options for tie rods 20, FIGS. 12 and 13 showing installation of two tie rods 20 in a cross configuration (FIG. 12) and a single tie rod 20 (FIG. 13), extending between opposing duct walls 22 of a duct 24, attachment flanges 32, 34 on ends 26 and 28 of the bodies 30 of the tie rods shown in overlaying abutment against the inside surface of the associated duct wall, heads of the respective fasteners 44 bearing against and compressing associated gasket 52 against the outer duct wall surface and threads 48 of threaded shanks 46 bearing against flanges 32 and 34.

Figure 14:
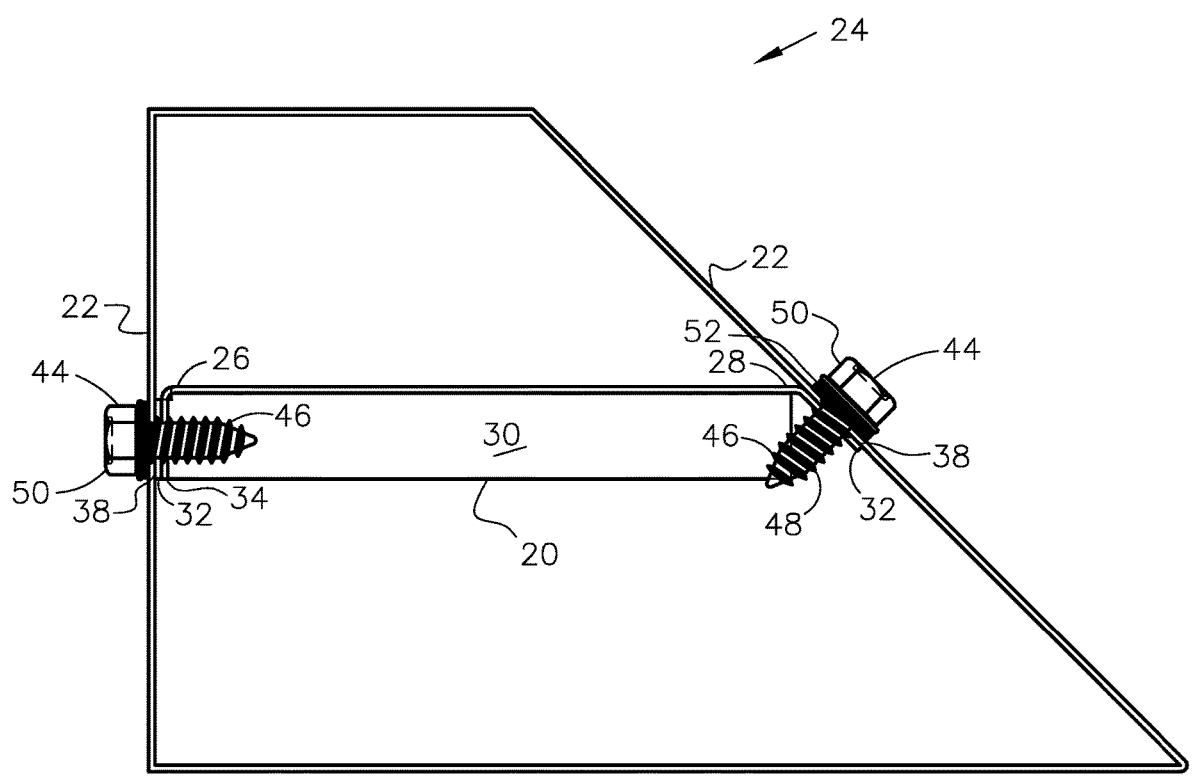
FIG. 14 is an end representation of an angled wall duct, showing installation of a tie rod between the angled wall and a straight wall, with attachment flanges secured to the duct walls by threaded fasteners.

FIG. 14 illustrates utility of the tie rods 20 of the invention for use with angled duct walls 22 of a duct 24, it being evident that an outer one of attachment flanges 32, 34 on one or both ends 26, 28 of the body 30 of the tie rod being bendable at an appropriate corresponding angle to the angle of an inner duct wall surface so as to be placed in abutting surface-to-surface contact therewith, a fastener 44 being threaded Lee engageable with the attachment flange 32, 34 to compress the gasket 52 between the head 50 of the fastener and the outer duct wall surface, as is similarly done at the opposite end of the tie rod.

Figure 15:
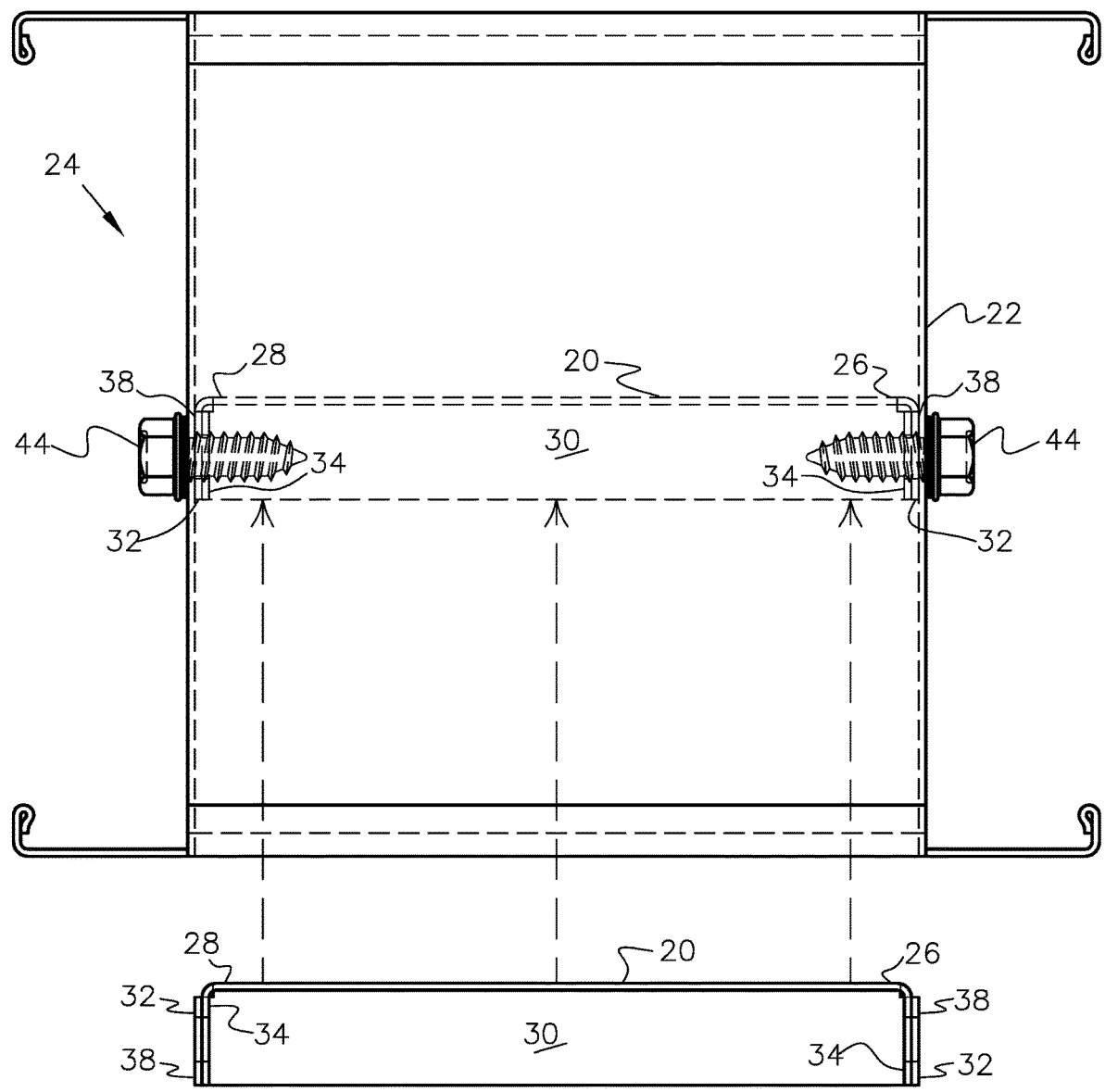
FIG. 15 is an end representation of a duct, showing installation of a tie rod of the invention between opposing duct walls within a duct, with attachment flanges pre-bent for installation, and with threaded fasteners securing the opposite ends of the tie rod to the duct walls.

Referring also to FIG. 15, another optional configuration of a tie rod 20 is shown, attachment flanges 32, 34 on ends 26, 28 of body 30 of the tie rod 20 shown already bent at the transverse angle relative to the longitudinal direction of tie rod 20 and pressed into an open end of a duct 24 as shown by arrows to engage the inner surfaces of opposite duct walls 22, holes through duct walls 22 being drillable from the interior of the duct 24 to allow insertion of fasteners 44 in any of the above described manners according to the invention.

Figure 16:
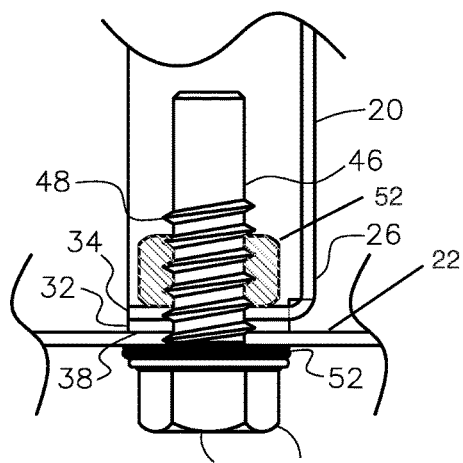
FIG. 16 is an end representation of a duct wall, showing installation of a tie rod of the invention, with attachment flanges secured to the duct wall by a threaded fastener installed from the exterior.
Figure 19:
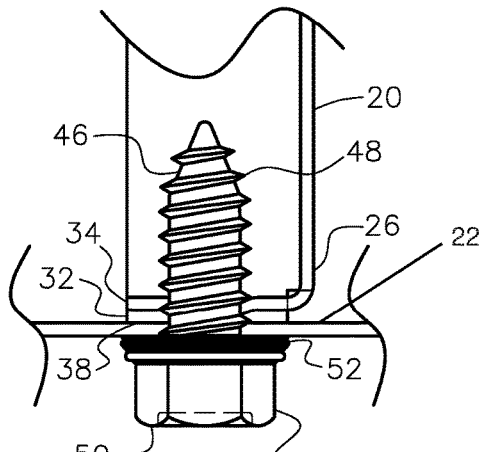
FIG. 19 is an end representation of a duct wall, showing installation of a tie rod of the invention, with attachment flanges secured to the duct wall by another embodiment of a threaded fastener.

FIGS. 16 and 19 show installation of a tie rod 20 in association with a representative duct wall 22, with fastener 44 installed from the exterior (fastener with pilot shank 46—FIG. 16 and pointed threaded shank—FIG. 19) to bring bearing surface 38 of attachment flange 32 on end 26 of the body of the tie rod to bear against the inner surface of the duct wall and flange 34 bearing against flange 32, gasket 52 being brought to bear against the outer surface of the duct wall by head 50 of the fastener to form an external seal, and an optional annular seal nut or gasket 52 being shown about and retained in position by threads 48 of the fastener of FIG. 16.

Figure 17:
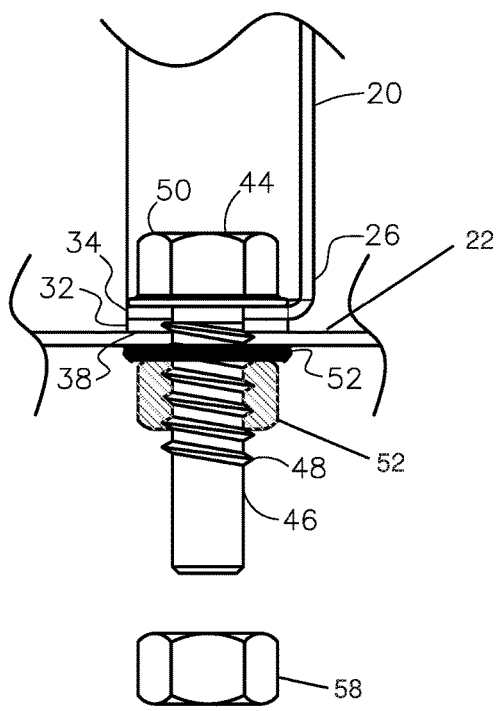
FIG. 17; is an end representation of a duct wall, showing installation of a tie rod of the invention, with attachment flanges secured to the duct wall by a threaded fastener installed from the interior, and showing a nut (external) for securing the fastener.

FIG. 17 shows a piloted fastener 44 installed from the interior of a duct wall 22 with head 50 of fastener 44 bearing against attachment flange 34 which in turn bears against attachment flange 32 to hold bearing surface 38 thereof in surface-to-surface contact with the inner surface of the duct wall, a nut style gasket 52 bearing against a flat annular gasket 52 to provide external sealing, and showing an optional threaded nut 58 threaded Lee engageable with threads 48 on shank 46 to exert a compression against gaskets 52 to create the seal and further secure the fastener 44.

Figure 18:
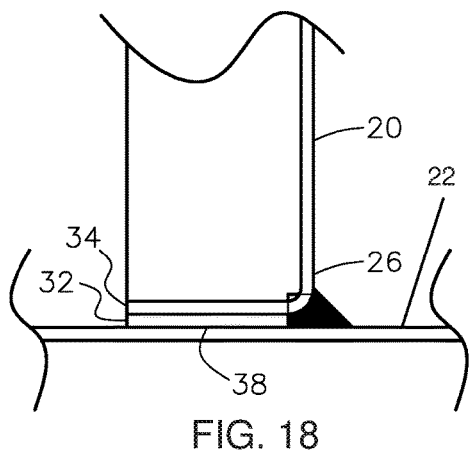
FIG. 18 is an end representation of a duct wall, showing installation of a tie rods to the duct wall by welding.

FIG. 18 shows an alternative arrangement wherein attachment flanges on end 26 of a tie rod 20 are spot welded to a duct wall 22 to hold bearing surface 38 to duct wall 22 in lieu of fastening with a threaded fastener, or, to hold tie rod 20 in place so that a fastener may be installed later or from the exterior. This manner of installation is envisioned when a tie rod would be installed distant from an open and of a duct.

Figure 20:
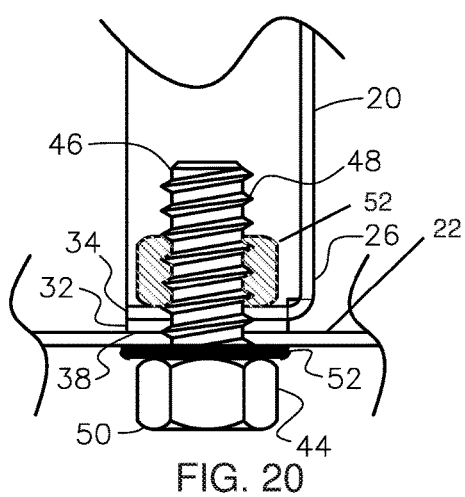
FIG. 20 is an end representation of a duct wall, showing installation of a tie rod of the invention, with attachment flanges secured to the duct wall by another embodiment of a threaded fastener.

FIG. 20 is an end representation of a duct wall 22, showing installation of a tie rod 20 of the invention internally within a duct, again using an externally installed fastener 44, head 50 thereof bearing against a gasket 52 to form a seal on the exterior surface of the wall, bearing surface 38 of attachment flange 32 on and 26 of the tie rod bearing against the interior surface of the wall a nut style gasket 52 installed around shank 46 and held in place by threads 48 to form an internal sealed condition. In light of all the foregoing, it should thus be apparent to those skilled in the art that there has been shown and described a DUCT TIE ROD AND METHOD according to the present invention. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A tie rod, comprising
an elongate body extending in and defining a longitudinal direction and having a V-, C-, or L-cross sectional shape, and opposite longitudinal end portions, at least one of the longitudinal end portions comprising two longitudinally spaced apart integral attachment flange extending transverse to the longitudinal direction and to each other, a longitudinally outer one of the integral attachment flanges having a longitudinally outwardly facing bearing surface, and at least one of the integral attachment flanges having an internal edge surface bounding and defining an unthreaded hole therethrough facing in the longitudinal direction to threadedly receive and engage a threaded shank of a threaded fastener for joining the fastener thereto without cutting a thread in the internal edge surface.

2. The tie rod of claim 1, wherein the internal edge surface has a teardrop shape.

3. The tie rod of claim 1, wherein the internal edge surface has an eye shape.

4. The tie rod of claim 1, wherein the internal edge surface has a diamond shape.

5. The tie rod of claim 1, wherein the internal edge surface has an oval shape.

6. The tie rod of claim 1, wherein the internal edge surface has a rectangular shape.

7. The tie rod of claim 1, wherein the internal edge surface has a round shape.

8. The tie rod of claim 1, wherein the internal edge surface has a triangular shape.

9. The tie rod of claim 1, wherein the integral attachment flanges are angularly related to each other at less than a 90 degree angle when viewed from a side.

10. The tie rod of claim 1, wherein at least one of the integral attachment flanges is integrally attached to the body along a weakening feature comprising at least one hole, notch, score, or groove.

11. The tie rod of claim 1, wherein the integral attachment flanges are angularly related to each other at more than a 90 degree angle when viewed from a side.

12. The tie rod of claim 1, wherein the internal edge surface of the at least one of the integral attachment flanges has a shape to threadedly receive the threaded shank while at an acute angle relative to the at least one of the integral attachment flanges.

13. A tie rod, comprising
an elongate body extending in and defining a longitudinal direction and having a V-, C-, flat or L-cross sectional shape, and opposite longitudinal end portions, each of the longitudinal end portions comprising at least one integral attachment flange extending in the longitudinal direction and integrally connected thereto along a feature comprising at least one hole or groove that is sufficiently weakened to allow bending the integral attachment flange by hand or with a hand tool to a transverse orientation relative to the longitudinal direction, the integral attachment flange having a bearing surface positioned and oriented to face longitudinally outwardly when the integral attachment flange is bent to the transverse orientation to the longitudinal direction, to be positionable to bear against a wall of a duct when the tie rod is located transversely within the duct, and the integral attachment flange having an internal edge surface bounding and defining a hole therethrough configured to receive a fastener to fasten the attachment flange to the wall of the duct when the bearing surface is bearing thereagainst.

14. The tie rod of claim 13, comprising a plurality of the tie rods nested together in a laterally extending stack.

15. A nested stack of tie rods for installing within a duct, each of the tie rods comprising:
an elongate body extending in and defining a longitudinal direction and having a V-, C-, or L-cross sectional shape, and opposite longitudinal end portions, at least one of the longitudinal end portions comprising two integral attachment flanges integrally attached thereto by a weakened bending feature and extending in the longitudinal direction, the two integral attachment flanges being oriented at an acute angle to each other, and each of the integral attachment flanges having an internal edge surface bounding and defining a hole therethrough configured to threadedly receive a fastener to fasten the attachment flange to a wall of the duct.

16. The nested stack of tie rods of claim 15, wherein the weakened bending feature comprises at least one hole.

17. The nested stack of tie rods of claim 15, wherein the weakened bending feature comprises at least one notch or slit.

18. The nested stack of tie rods of claim 15, wherein the weakened bending feature comprises at least one scored line.

* * * * *